Oct. 8, 1929.   J. S. KEEN   1,731,138
PUSH POLE FOR LOCOMOTIVES
Filed Sept. 16, 1927   3 Sheets-Sheet 1

Inventor:
John S Keen
by his Attorneys
Howson & Howson

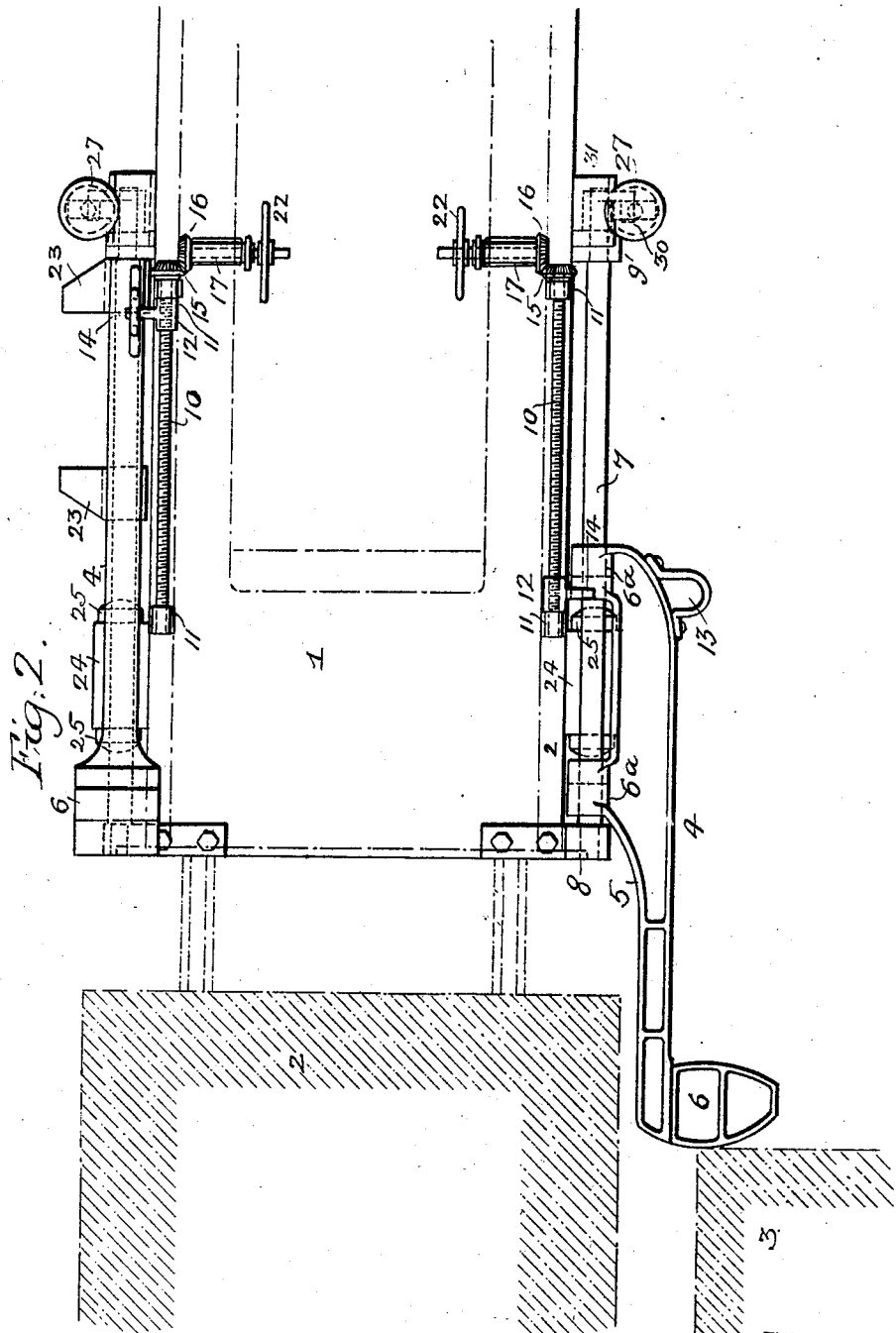

Oct. 8, 1929.     J. S. KEEN     1,731,138
PUSH POLE FOR LOCOMOTIVES
Filed Sept. 16, 1927     3 Sheets-Sheet 3
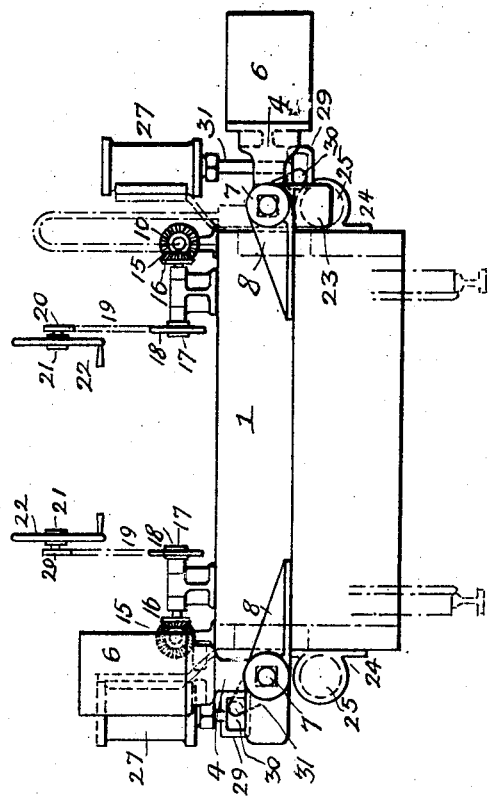
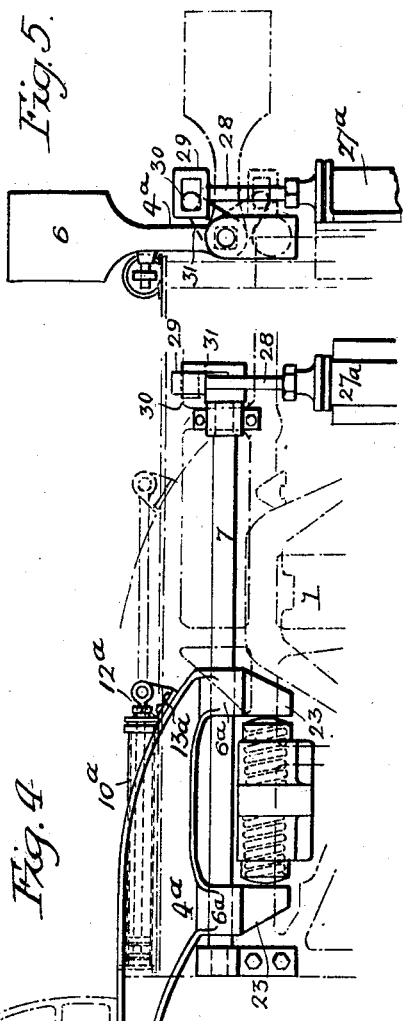
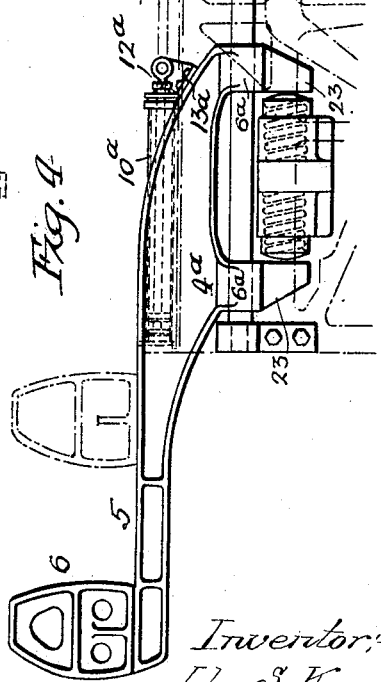
Inventor:-
John S. Keen
by his Attorneys Patented Oct. 8, 1929

1,731,138

UNITED STATES PATENT OFFICE

JOHN S. KEEN, OF PHILADELPHIA, PENNSYLVANIA

PUSH POLE FOR LOCOMOTIVES

Application filed September 16, 1927. Serial No. 219,921.

My invention relates to certain improvements in push poles of locomotives, especially electric locomotives.

The object of my device is to permit the locomotive to push or pull cars on tracks at either side of a central track on which the locomotive is operated.

The invention is especially adapted to spot dump cars at a predetermined distance beyond the permanent or fixed car dumping mechanism, which requires that the push pole on the side opposite the side on which the push pole is operating to recede or move out of the way to prevent interference with the dumping mechanism.

In the accompanying drawings:

Fig. 2 is a plan view of the mechanism being in a position similar to that shown in Fig. 1;

Fig. 3 is an end view;

Fig. 4 is a side view illustrating a modification of the invention; and

Fig. 5 is an end view of a portion of Fig. 4.

Figure 1:
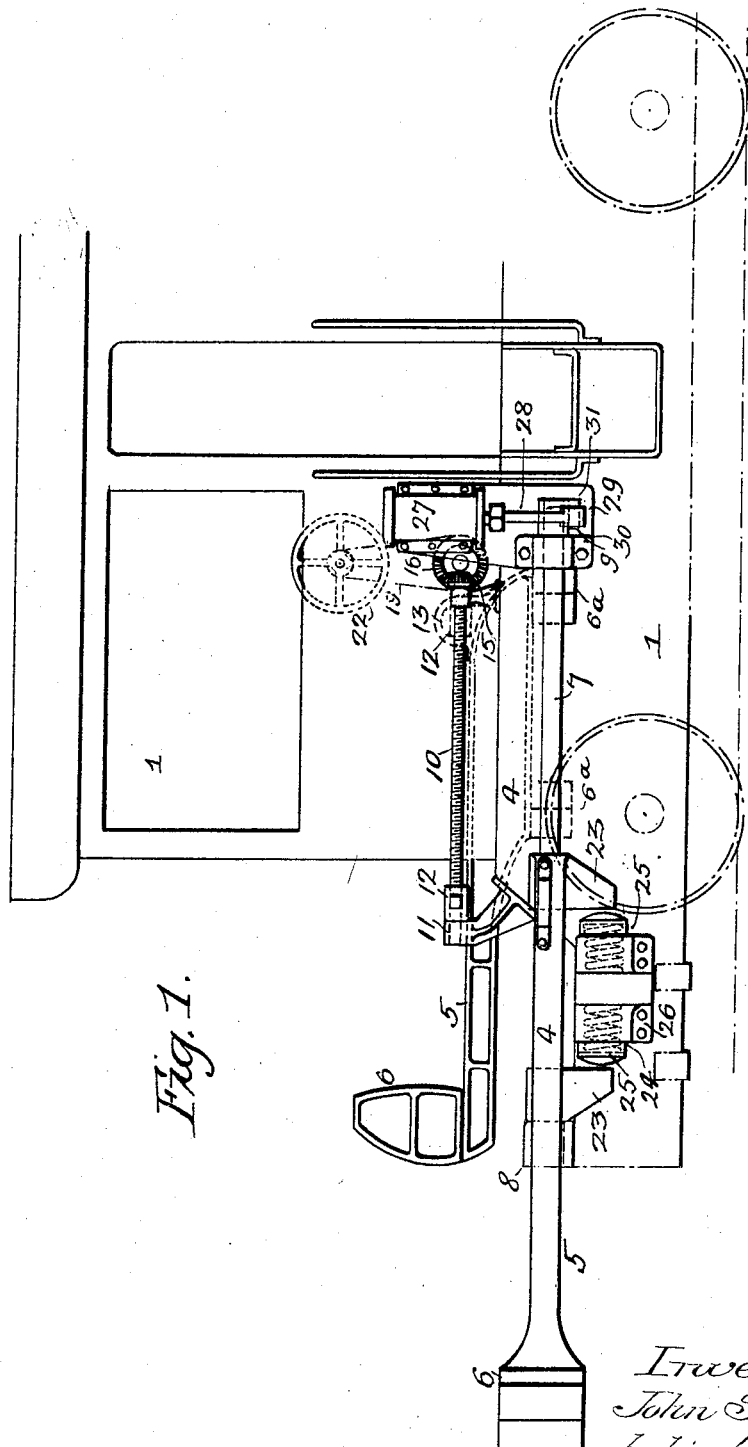
Fig. 1 is a side view of a portion of a locomotive showing the two push poles, one on each side of the locomotive, one pole being retracted and the other being extended and located in position to push a car.

1 is the locomotive which is mounted on suitable tracks. 2 is the outline of the car-dumping mechanism, and 3 is a view of a car being located in the proper position in respect to the car-dumping apparatus by the push pole of the locomotive, the several parts being shown by dotted lines.

4 is the push pole, consisting of an extended bracket 5 having a head 6 which is rounded at each side in the present instance, although it may be shaped otherwise without departing from my invention. This pole has trunnions 6ª which are mounted on a square shaft 7 having its bearings in brackets 8 and 9. The push pole is turned by this shaft 7, and is moved longitudinally thereon, so that the head can be projected or retracted.

One method of operating the push pole is shown in Figs. 1 and 2, in which 10 is a screw mounted in bearings 11—11, and on this screw is a nut 12 which is connected to the push pole 4. In the present instance a pin 14 on the nut extends through an eye 13 formed by a U-shaped metal plate secured to the pole, so that when the pole is in the vertical position the nut is in engagement with the pole, but when the pole is turned, so as to project in the path of the car, then the nut is free from the pole.

On the inner end of the screw 10 is a beveled wheel 15 which meshes with another beveled wheel 16 on a shaft 17 on which is a sprocket wheel 18. A chain 19 passes around the sprocket shaft 21 on which is a hand-wheel 22, so that on turning the hand-wheel the nut 12 will travel on the screw and will project or retract the push pole, depending upon which direction the wheel is turned.

In order to hold the push pole in its projected position, lugs 23 are formed on the pole, which extend at either end of a bumper bracket 24, Fig. 1, having yielding bumper plungers 25 backed by springs 26, so that the thrust is taken by these bumper brackets and not by the screw.

The shaft 7 in the present instance is square, and the trunnions 6ª—6ª are also square, so that the pole must turn with the shaft. In order to turn the shaft a fluid pressure cylinder 27 is used, having a piston 28 which has a cross-head 29 in which is located a pin 30 on an arm 31 on the rear end of the squared rod 7. When fluid is admitted to the other end of the cylinder, the pole is turned so as to be clear of the car, and when the pole is retracted it will not interfere with the working of the pole on the opposite side of the locomotive. Other means of turning the pole may be resorted to without departing from the essential features of the invention, and other means may be used for projecting the pole. For instance, an air cylinder 10ª having a piston 12ª attached to a bracket 13ª on the bumper bar 4ª may be used, and the air cylinder 27ª may be inverted as clearly shown in Figs. 4 and 5.

I claim—

1. The combination of a locomotive having a push pole at one side; means for turning the pole so as to bring it into the path of the car being shifted; means for moving the pole longitudinally of the locomotive so as to either project the pole or retract the same; and fixed bumper mechanism in the path of the pole when in its active position.

2. The combination of a locomotive; a push pole at one side of the locomotive, said pole having a laterally projecting head arranged to engage a car and having trunnions; a square shaft mounted in bearings and extending through the trunnions of the push pole; means for turning the shaft so as to move the pole into active or inactive position; means for moving the pole longitudinally on the shaft; lugs on the pole; and fixed bumpers on the locomotive so located that when the push pole is in position to push a car the lugs will be in line with the bumper.

3. The combination of a locomotive; a longitudinally arranged shaft mounted in bearings and rectangular in cross-section; a fluid pressure cylinder having a piston; an arm on the shaft actuated by the piston so as to turn the shaft to either of its two positions; a push pole arranged to slide on and turn with the shaft and provided with a head at the end of the extension; a lug on the pole; a bumper on the locomotive, said lug aligning with the bumper when the push pole is in its operative position; a screw for moving the pole longitudinally; means for turning the screw; a nut on the screw arranged to engage the push pole when said push pole is raised into its inactive position, so that on turning the screw the push pole can be moved longitudinally on the bar.

4. The combination in a locomotive, or the like, of a push pole mounted at one side of the locomotive; means for turning said push pole axially so that it can be moved into the path of the car to be shifted or moved clear of said car; and means for moving the pole longitudinally of the locomotive along said axis so as to either project or retract said pole.

JOHN S. KEEN.